(12) United States Patent
Kusano et al.

(10) Patent No.: US 8,039,786 B2
(45) Date of Patent: Oct. 18, 2011

(54) ABSOLUTE POSITION ENCODER OBTAINS SIGNALS CORRESPONDING TO INDIVIDUAL IMAGING RANGES OF IMAGING OPTICAL SYSTEMS

(75) Inventors: Kouhei Kusano, Kawasaki (JP); Kouji Morimoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 408 days.

(21) Appl. No.: 12/385,999

(22) Filed: Apr. 27, 2009

(65) Prior Publication Data

US 2009/0294637 A1 Dec. 3, 2009

(30) Foreign Application Priority Data

Jun. 2, 2008 (JP) ................................. 2008-144896

(51) Int. Cl.
G01D 5/34 (2006.01)
H01L 27/00 (2006.01)
H03M 1/22 (2006.01)
(52) U.S. Cl. ................... 250/231.13; 250/208.1; 341/13
(58) Field of Classification Search .............. 250/231.1, 250/231.13–231.18, 559.29, 559.44, 555–557, 250/208.1, 208.2, 214.1, 214 R, 221, 566, 250/568; 341/9, 13, 57, 56, 52, 11, 14; 356/615–617; 33/1 M, 1 N, 1 I, 1 PT; 382/174–180, 190, 195, 199, 200, 203, 321, 382/323; 702/105, 106, 150, 151, 161, 182, 702/183, 117, 120, 179
See application file for complete search history.

(56) References Cited

U.S. PATENT DOCUMENTS

| | | | | |
|---|---|---|---|---|
| 3,096,441 A * | 7/1963 | Burkhardt | ..................... | 356/616 |
| 4,439,672 A * | 3/1984 | Salaman | ................... | 235/462.01 |
| 4,469,417 A * | 9/1984 | Masunaga et al. | ............ | 396/128 |
| 4,870,559 A * | 9/1989 | Hyatt | ................................ | 700/1 |
| 2007/0051884 A1* | 3/2007 | Romanov et al. | ........ | 250/231.13 |

FOREIGN PATENT DOCUMENTS

JP A-2007-218691 8/2007

* cited by examiner

*Primary Examiner* — Thanh X Luu
*Assistant Examiner* — Jennifer Bennett
(74) *Attorney, Agent, or Firm* — Oliff & Berridge, PLC

(57) ABSTRACT

In an absolute position detection type photoelectric encoder devised so as to detect a pseudorandom pattern disposed on a main scale by means of a plurality of imaging optical systems, assembling of the absolute position detection type photoelectric encoder is facilitated and production cost thereof is reduced by providing: a single light-receiving array element disposed on the imaging surfaces of the imaging optical systems, which incorporates a greater light-receiving array portion in the length measurement direction than the light-receiving range of the respective imaging optical systems; a window signal storing portion for storing a window signal showing a light-receiving range of the respective imaging optical systems; and a window signal comparison portion for obtaining signals corresponding to individual imaging ranges by comparing scanning signals of the light-receiving array element with window signals.

12 Claims, 6 Drawing Sheets

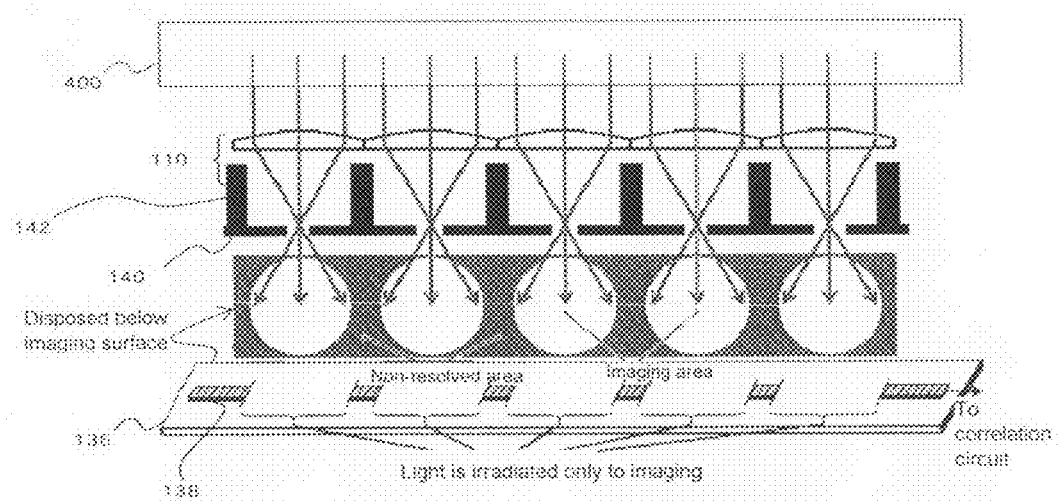
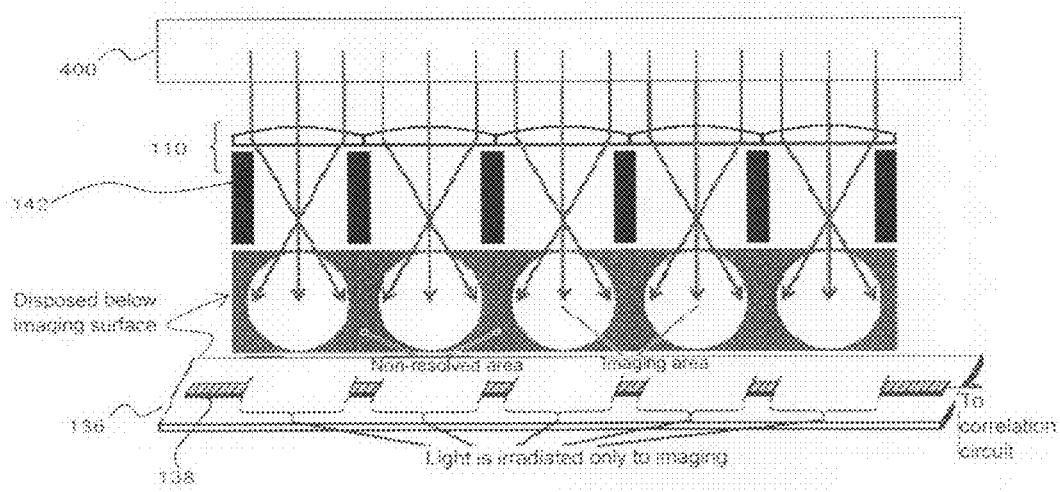

ABSOLUTE POSITION ENCODER OBTAINS SIGNALS CORRESPONDING TO INDIVIDUAL IMAGING RANGES OF IMAGING OPTICAL SYSTEMS

CROSS-REFERENCE TO RELATED APPLICATION

The disclosure of Japanese Patent Application No. 2008-144896 filed on Jun. 2, 2008 including specifications, drawings and claims is incorporated herein by reference in its entirety.

BACKGROUND OF THE INVENTION

1. Field of the Invention

The present invention relates to an absolute position detection type photoelectric encoder that is devised so as to detect a pseudorandom pattern disposed on a main scale by a plurality of imaging optical systems, and in particular to an absolute position detection type photoelectric encoder that can be easily assembled at a low cost.

2. Description of the Related Art

The present applicant has proposed an absolute position detection type photoelectric encoder, which detects a pseudorandom pattern 200 disposed on a main scale (not illustrated) by means of a plurality of imaging optical systems (five systems in FIG. 1) 110A through 110E as shown in FIG. 1, in Japanese Published Unexamined Patent Application No. 2007-218691 (hereinafter called "Patent Document 1," and referencing Paragraph Nos. [0035], [0044], FIG. 8 and FIG. 20 hereof).

With the configuration, a plurality of light-receiving array elements 130A through 130E are disposed on the imaging surface of the imaging optical system (for example, lens arrays) 110 in accordance with the imaging ranges of the respective imaging optical systems 110A through 110E.

However, since it is necessary that the positions of the respective imaging optical systems 110A through 110E are exactly matched with the positions of the light-receiving array elements 130A through 130E corresponding thereto, high assembling accuracy is required, which resultantly increases the production cost.

SUMMARY OF THE INVENTION

The present invention was developed to solve such conventional problems, and it is therefore an object of the present invention to facilitate assembling and to reduce the production cost by disposing a single light-receiving array to a plurality of imaging ranges based on a plurality of imaging optical systems.

The present invention solves the above-described problems by providing: a single light-receiving array element disposed on the imaging surfaces of the imaging optical systems, which incorporates a greater light-receiving array portion in the length measurement direction than the light-receiving range of the respective imaging optical systems; a window signal storing portion for storing a window signal showing a light-receiving range of the respective imaging optical systems; and a window signal comparison portion for obtaining signals corresponding to individual imaging ranges by comparing scanning signals of the light-receiving array element with window signals; in an absolute position detection type photoelectric encoder devised so as to detect a pseudorandom pattern disposed on a main scale by means of a plurality of imaging optical systems.

Here, a binarization circuit for obtaining a window signal showing a light-receiving range of the respective imaging optical systems and a binarization circuit for binarizing a scanning signal of the light-receiving array element may further be provided.

Also, an imaging data inverting portion may further be provided, which returns individual light-receiving ranges, which are inverted by the respective imaging optical systems, to the original image data by inverting the same again with reference to signals from the window signal storing portion.

Further, a correlator for carrying out a correlation calculation of the signals inverted in the imaging data inverting portion and of the pseudorandom pattern that becomes the basis, and an absolute position calculating portion for determining the absolute position on the pseudorandom pattern based on the result of the correlation calculation may further be provided.

In addition, the light-receiving array portion may be made into a single light-receiving array portion that is continuous in the length measurement direction, and signals corresponding to individual imaging ranges may be obtained by window signals corresponding to the order of scanning signals in the window signal comparison portion.

Or, the light-receiving array portion may be independently provided for each of the light-receiving ranges of the respective imaging optical systems, and signals corresponding to individual imaging ranges may be obtained by a logical product of scanning signals and window signals in the window signal comparison portion.

Also, in the window signal comparison portion, the scanning signals may be converted to ternary values consisting of a value corresponding to a bright portion, a value corresponding to the outside of the light-receiving ranges of the respective imaging optical systems, and a value corresponding to a dark portion.

Further, the value corresponding to the outside of the light-receiving range of the respective imaging optical systems may be made into 0.

Further, a scanning signal change portion may further be provided, which changes over scanning signals when measuring an imaging range and when executing normal measurement in order to obtain window signals after the imaging optical systems and the light-receiving array elements are assembled.

Also, an aperture array may be inserted in the focusing position of the lens array that composes the image optical system.

Further, a partitioning plate may be provided between lenses adjacent to the lens array that composes the imaging optical system.

In addition, the window signal may be obtained by detecting a bright portion with an overall white surface scale opposed thereto instead of the main scale after the imaging optical system and the light-receiving array element are assembled.

According to the present invention, since only a single light-receiving array element is disposed, assembling is facilitated at a low cost. Also, since the imaging range can be detected by the window signal even if the position of the imaging optical system is changed, data of necessary range can be extracted, and the absolute position can be detected at high accuracy.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein;

FIG. 10 is a view showing a scale portion according to Embodiment 4 of the present invention; and FIG. 11 is a view showing a scale portion according to Embodiment 5 of the present invention.

DETAILED DESCRIPTION OF THE PREFERRED EMBODIMENTS

Hereinafter, with reference to the accompanying drawings, a detailed description is given of the embodiments of the present invention.

Figure 1:
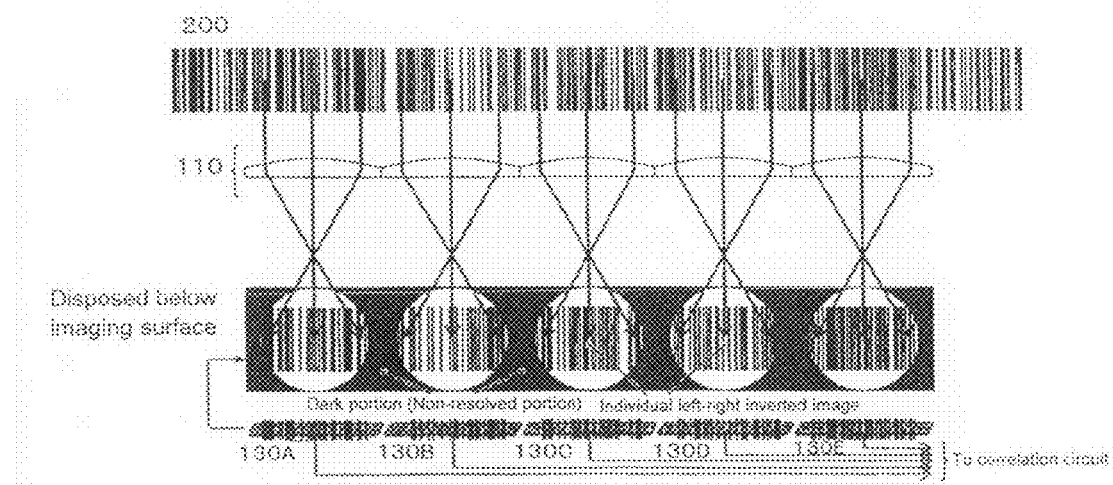
FIG. 1 is a view showing a scale portion of one example of a prior art absolute position detection type photoelectric encoder proposed by the applicant in Patent Document 1.
Figure 2:
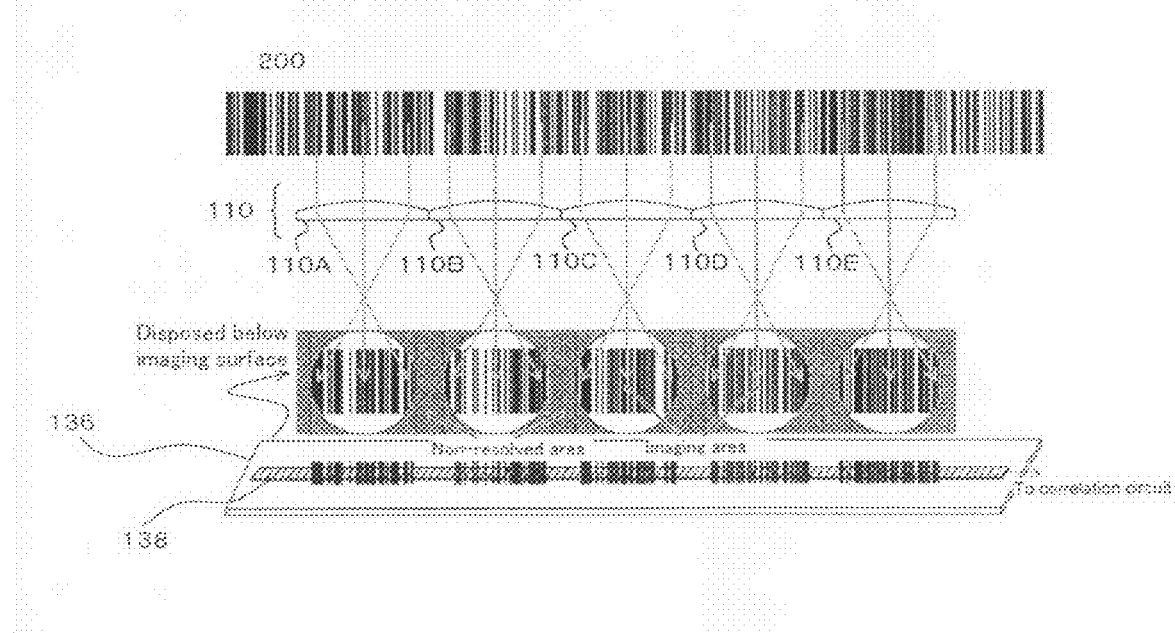
FIG. 2 is a view showing a scale portion according to Embodiment 1 of the present invention.
Figure 3:
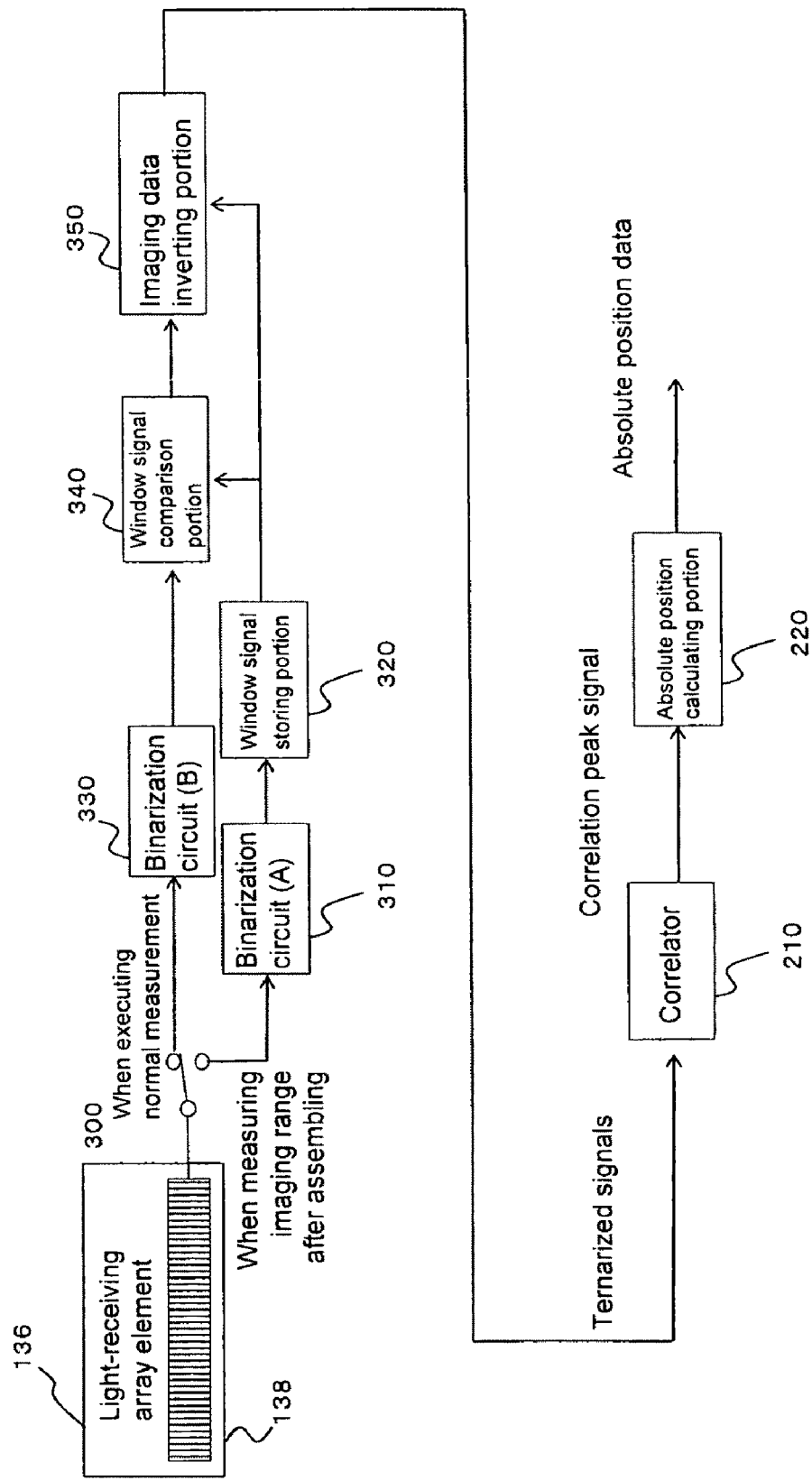
FIG. 3 is a block diagram showing a signal processing circuit according to Embodiment 1.

As shown in FIG. 2 (Scale portion) and FIG. 3 (Processing circuit portion), the present embodiment is an absolute position detection type photoelectric encoder devised so as to detect a pseudorandom pattern 200 disposed on the main scale by means of a plurality of imaging optical systems 110A through 110E, which includes:

a single light-receiving array element 136, disposed on imaging surface of the imaging optical system 110, which incorporates a single light-receiving array portion 138 that is continuous and larger in length measurement direction (the left and right direction in FIG. 2) than light-receiving range of the respective imaging optical systems 110A through 110E;

a binarization circuit (A) 310 for obtaining the window signal showing the light-receiving range of the respective imaging optical systems 110A through 110E;

a window signal storing portion 320 for storing obtained window signals;

a binarization circuit (B) 330 for binarizing a scanning signal of the light-receiving array element 136;

a window signal comparison portion 340 for comparing a scanning signal with a window signal, and outputting and ternarizing those to a value (for example, +1) corresponding to a bright portion, a value (for example, 0) corresponding to the outside (hereinafter called a non-resolved portion) of the light-receiving range of the respective imaging optical systems, and a value (for example, −1) corresponding to a dark portion; and an imaging data inverting portion 350 for returning individual light-receiving ranges, which are inverted by the respective imaging optical systems 110A through 110E, to the original image data by inverting the same with reference to signals from the window signal storing portion 320.

In FIG. 3, reference numeral 210 denotes a correlator as in Patent Document 1, reference numeral 220 denotes an absolute position calculating portion, and reference numeral 300 denotes a scanning signal change portion for changing over the scanning signals when measuring the imaging range and when executing normal measurement, in order to obtain window signals after the image optical system 110 and the light-receiving array element 136 are assembled.

The scanning signal change portion 300, the binarization circuits 310, 330, the window signal storing portion 320, the window signal comparison portion 340 and the imaging data inverting portion 350 are inserted between the light-receiving array element 136 and the correlator 210.

Figure 4:
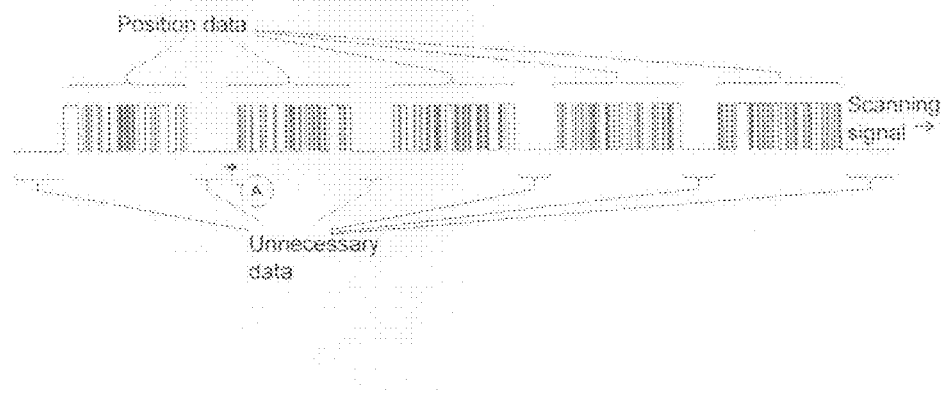
FIG. 4 is a view showing an example of a scanning signal from a single light-receiving array portion according to Embodiment 1.

In the case of the present embodiment, the scanning signals output from the single light-receiving array portion 138 are divided into position data obtained from the imaged left-right inverted image area and unnecessary data obtained from the non-resolved area as exemplarily shown in FIG. 4.

Here, by only observing the scanning signals, it is impossible to determine whether, for example, the portion A of FIG. 4 is at a low level as the unnecessary data or at a low level as the position data. Further, the positions of the respective data on the single light-receiving array portion 138 move left and right, depending on assembling of the imaging optical system 110 and the light-receiving array element 136. Therefore, it is necessary to know the imaging range.

Figure 5:
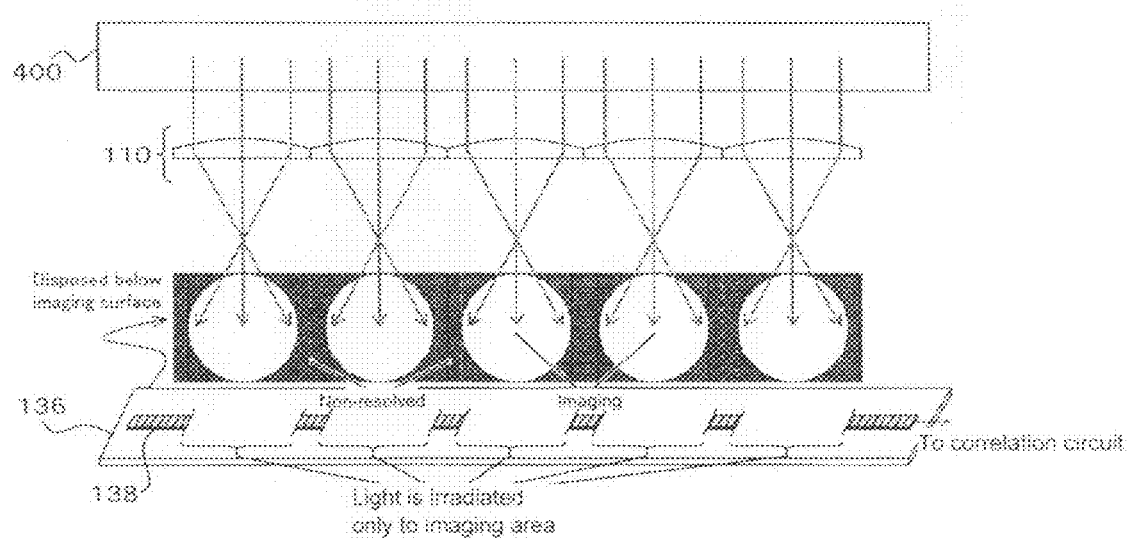
FIG. 5 is a view showing a state where the overall white surface scale is measured to obtain a window signal in Embodiment 1.
Figure 6:
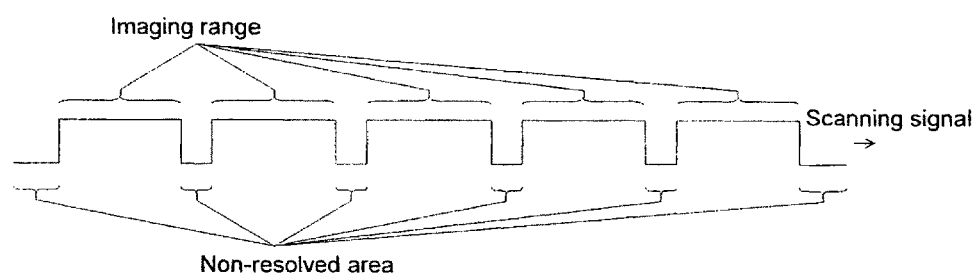
FIG. 6 is a view showing an example of a scanning signal where the overall white surface scale is measured as well.

Accordingly, in the present embodiment, the scanning signal change portion 300 is changed to the imaging range measurement side after the imaging optical system 110 and the light-receiving array element 136 are assembled, and as shown in FIG. 5, a scale 400 the entire surface of which is white (herein "white" is observed as a "bright portion" in the light-receiving array element 136) is detected. Where the overall white surface scale 400 has been measured, in the scanning signal from the light-receiving array portion 138, a range to which light is irradiated, that is, an imaging range is brought into a high level as shown in FIG. 6, and the range is determined to be an imaging range.

And, the scanning signals (hereinafter called a "window signal") in the case of having measured the overall white surface scale 400 are binarized to a value (for example, +1) corresponding to a high level and a value (for example, 0) corresponding to a low level in the binarization circuit (A) 310, and are thereafter stored in the window signal storing portion 320, for example, consisting of a non-volatile memory.

Figure 7:
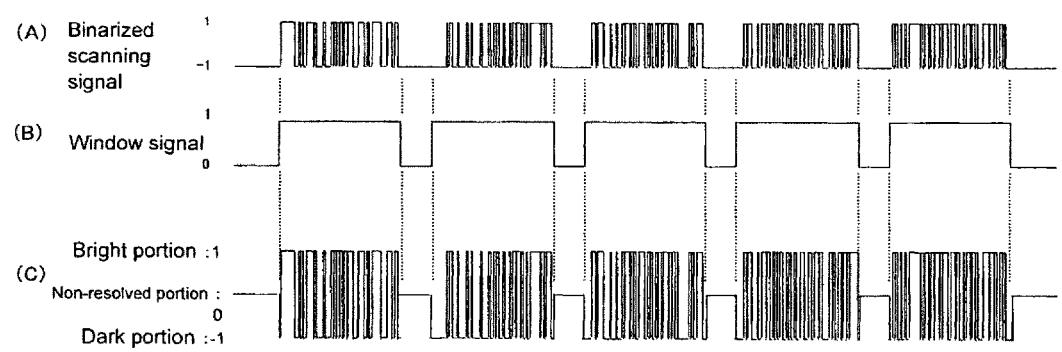
FIG. 7 is a view showing a state where individual detection patterns are extracted using the window signal as well.

And, when executing normal measurement, the scanning signal change portion 300 is changed to normal measurement, and the scanning signals obtained from the light-receiving array portion 138 are binarized (FIG. 7(A)) to a value (for example, +1) corresponding to a high level and a value (for example, −1) corresponding to a low level in the binarization circuit (B) 330, and are thereafter input into the window signal comparison portion 340.

By comparing the binarized signals with the stored window signals (FIG. 7(B)) in the window signal comparison portion 340, the scanning signals are ternarized as shown in FIG. 7(C) to a value (for example, +1) corresponding to the bright portion, a value (for example, 0) corresponding to the outside (that is, the non-resolved portion) of the light-receiving range of the respective imaging optical systems and a value (for example, −1) corresponding to the dark portion and are output.

Since the signals ternarized in the window signal comparison portion 340 are for an image left-right inverted for each of the light-receiving ranges of the respective imaging optical systems 110A through 110E, processing of inverting the light-receiving ranges of the ternarized signals is carried out in the imaging data inverting portion 350 with reference to the window signals.

The correlator 210 shown in FIG. 3 carries out a correlation calculation along with the pseudorandom pattern, which becomes the basis, with respect to the signals inverted in the imaging data inverting portion 350. And, the signals are determined to be the absolute position on the pseudorandom pattern by the absolute position calculating portion 220.

In the present embodiment, since the window signal comparison portion 340 ternarizes so that the non-resolved portion is made into 0, the correlation calculation is facilitated. In detail, in the example in which the bright portion of the scanning signal obtained from the light-receiving array portion 138 is made into 1, the dark portion thereof is made into −1, and the non-resolved portion thereof is made into 0, and the code values of the pseudorandom pattern that become the basis are caused to correspond to 1 and −1, the code of the non-resolved portion becomes 0 in the product-sum calculation in the process of the correlation calculation, and an advantage is brought about by which no influence is given to the correlation peak value. Also, it may be possible to make the value of the non-resolved portion into a value other than 0 or to binarize so that the non-resolved portion is made into the same value as, for example, the dark portion.

Further, in the present embodiment, since the light-receiving array portion 138 is made into a single light-receiving array portion that is continuous in the length measurement direction, the same light-receiving array element may be used even if the design is changed with respect to the pitch and size of the imaging optical system, wherein the development cost can be reduced to a low level.

Figure 8:
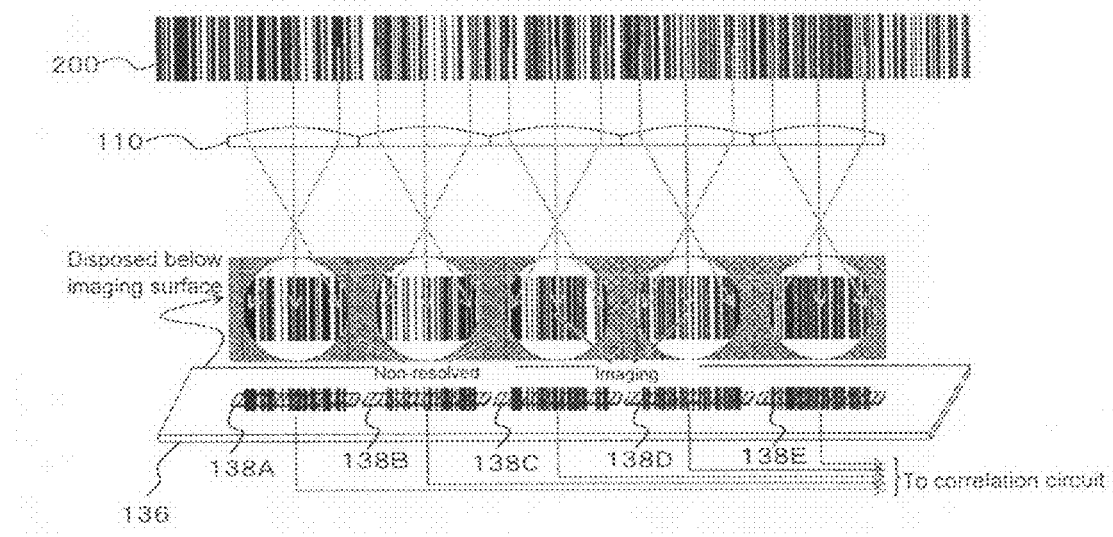
FIG. 8 is a view showing a scale portion according to Embodiment 2 of the present invention.

In addition, the present invention is not limited to the above embodiment. The invention may be applicable to such an embodiment in which a single light-receiving array element 136 having a plurality of light-receiving array portions 138A through 138E is disposed on the imaging surface of the imaging optical system 110 as in Embodiment 2 shown in FIG. 8.

In the present embodiment, it is possible to prevent an error due to signals from the non-resolved portion.

Figure 9:
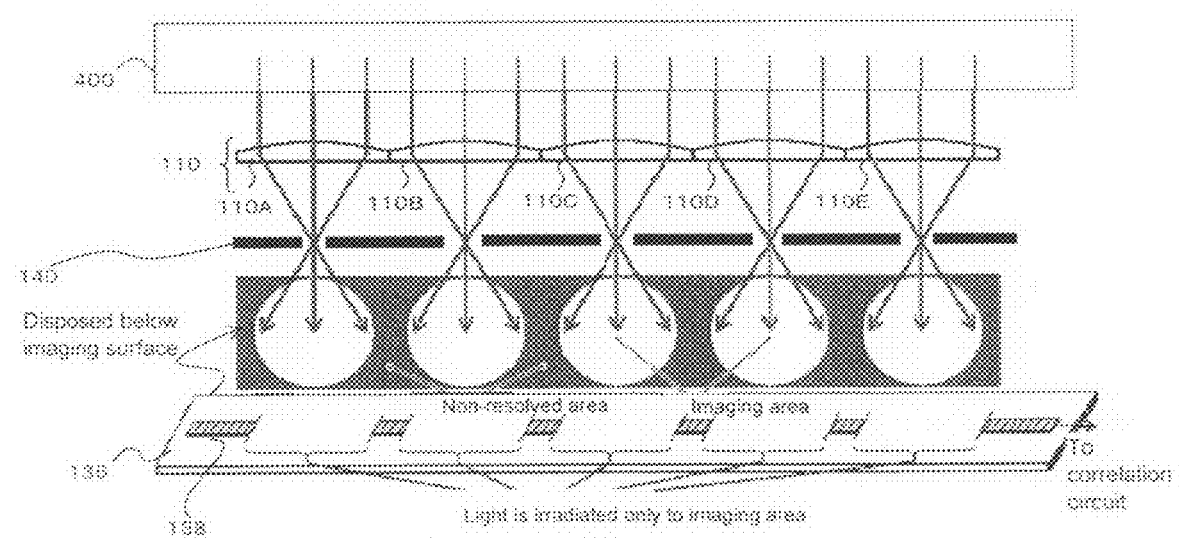
FIG. 9 is a view showing a scale portion according to Embodiment 3 of the present invention.

Also, where the imaging optical system 110 is composed of a lens array, stray light can be entered from adjacent lens, wherein there is a possibility for the stray light to become noise. Accordingly, as in Embodiment 3 shown in FIG. 9, an aperture array 140 may be provided between the imaging optical system 110 and the light-receiving array portion 138.

Thus, by providing the aperture array 140, stray light from the adjacent optical systems is prevented with respect to light from the individual imaging optical systems 110A through 110E, and the S/N ratio of the imaging portion to the non-resolved portion can be increased. Therefore, a remarkable effect can be brought about particularly when acquiring a window signal.

Further, as in Embodiment 4 shown in FIG. 10, by providing a partitioning plate 142 between the lens array 110 and the aperture array 140, stray light can be further securely prevented.

Also, when no aperture is required since the N.A. of the lens array 110 is smaller, it may be sufficient that only the partitioning plate 142 is provided with the aperture array omitted as in Embodiment 5 shown in FIG. 11.

Since any one of the embodiments described above is composed so that a window signal is obtained by using the overall white surface scale, it is possible to remarkably easily obtain the window signal. In addition, the method for obtaining the window signal is not limited thereto, and further, the imaging optical system is not limited to the lens array, wherein the number thereof is not limited to five.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An absolute position detection type photoelectric encoder devised so as to detect a pseudorandom pattern disposed on a main scale by a plurality of imaging optical systems, including:

a single light-receiving array element disposed on imaging surfaces of the imaging optical systems, which incorporates a greater light-receiving array portion in length measurement direction than light-receiving range of the respective imaging optical systems;

a window signal storing portion for storing a window signal showing the light-receiving range of the respective imaging optical systems; and a window signal comparison portion for obtaining signals corresponding to individual imaging ranges by comparing scanning signals of the light-receiving array element with the window signals.

2. The absolute position detection type photoelectric encoder according to claim 1, further including:

a binarization circuit for obtaining the window signal showing the light-receiving range of the respective imaging optical systems; and a binarization circuit for binarizing the scanning signal of the light-receiving array element.

3. The absolute position detection type photoelectric encoder according to claim 1, further including: an imaging data inverting portion for returning individual light-receiving ranges, which are inverted by the respective imaging optical systems, to original image data by inverting the same again with reference to signals from the window signal storing portion.

4. The absolute position detection type photoelectric encoder according to claim 1, further including:

a correlator for carrying out a correlation calculation of the signals inverted in the imaging data inverting portion and of the pseudorandom pattern that becomes a basis; and an absolute position calculating portion for determining absolute position on the pseudorandom pattern based on result of the correlation calculation.

5. The absolute position detection type photoelectric encoder according to claim 1, wherein the light-receiving array portion is made into a single light-receiving array portion that is continuous in the length measurement direction, and obtains signals corresponding to individual imaging ranges by the window signals corresponding to order of the scanning signals in the window signal comparison portion.

6. The absolute position detection type photoelectric encoder according to claim 1, wherein the light-receiving array portion is independently provided for each of the light-receiving ranges of the respective imaging optical systems, and signals corresponding to individual imaging ranges are obtained by a logical product of the scanning signals and the window signals in the window signal comparison portion.

7. The absolute position detection type photoelectric encoder according to claim 1, wherein, in the window signal comparison portion, the scanning signals are converted to ternary values consisting of a value corresponding to a bright portion, a value corresponding to outside of the light-receiving ranges of the respective imaging optical systems, and a value corresponding to a dark portion.

8. The absolute position detection type photoelectric encoder according to claim 7, wherein the value corresponding to the outside of the light-receiving range of the respective imaging optical systems is made into 0.

9. The absolute position detection type photoelectric encoder according to claim 1, further including: a scanning signal change portion that changes over scanning signals when measuring an imaging range and when executing normal measurement, in order to obtain the window signals after the imaging optical systems and the light-receiving array elements are assembled.

10. The absolute position detection type photoelectric encoder according to claim 1, wherein an aperture array is inserted in focusing position of lens array that composes the imaging optical system.

11. The absolute position detection type photoelectric encoder according to claim 1, wherein a partitioning plate is provided between lenses adjacent to lens array that composes the imaging optical system.

12. The absolute position detection type photoelectric encoder according to claim 1, wherein the window signal is obtained by detecting a bright portion with an overall white surface scale opposed to the imaging optical system and the light-receiving array element instead of the main scale after the imaging optical system and the light-receiving array element are assembled.

* * * * *